United States Patent [19]
Bailey et al.

[11] Patent Number: 4,816,504
[45] Date of Patent: Mar. 28, 1989

[54] STABILIZED POLYCARBONATES

[75] Inventors: John V. Bailey; Sivaram Krishnan, both of Pittsburgh, Pa.

[73] Assignee: Mobay Corporation, Pittsburgh, Pa.

[21] Appl. No.: 107,811

[22] Filed: Oct. 13, 1987

Related U.S. Application Data

[62] Division of Ser. No. 722,029, Apr. 11, 1985, abandoned.

[51] Int. Cl.[4] .......................... C08K 5/34; G02C 1/00
[52] U.S. Cl. .......................................... 524/91; 351/41
[58] Field of Search ........................ 350/1.1; 351/41; 524/91

[56] References Cited

U.S. PATENT DOCUMENTS

| | | | |
|---|---|---|---|
| 3,004,896 | 10/1961 | Heller et al. | 167/90 |
| 3,189,615 | 6/1965 | Heller et al. | 548/260 |
| 3,322,719 | 5/1967 | Peilstocker | 524/91 |
| 3,367,958 | 2/1968 | Kirkendall | 524/91 |
| 3,502,613 | 3/1970 | Berger | 524/91 |
| 3,892,889 | 7/1975 | Cohnen et al. | 427/160 |
| 3,935,163 | 1/1976 | Spivack et al. | 524/91 |
| 4,079,160 | 3/1978 | Philipson | 351/41 |
| 4,096,115 | 6/1978 | Irick et al. | 524/83 |
| 4,206,111 | 6/1980 | Valdiserri et al. | 524/91 |
| 4,283,327 | 8/1981 | Dexter et al. | 524/91 |

FOREIGN PATENT DOCUMENTS 161765  11/1985  European Pat. Off. .

OTHER PUBLICATIONS

Patents Abstracts of Japan, vol. 7, No. 234, Oct. 18, 1983.
Patents Abstracts of Japan, vol. 2, No. 52, Apr. 14, 1978.
Patents Abstracts of Japan, vol. 6, No. 35, Mar. 3, 1982.
Gugumus, F. Lichtschutzmittel, Kunstoffe 74 (1984), 10, pp. 620–623.
Ciba–Geigy Kunststoff–Additive, Publ.–Nr. 830, 901/20/d./Ue, Taschenbusch der Kunststoff–Additive, Dr. R. Gächter & Dr. H. Müller, Carl Hanser Verlag Münchine Wien 1983.

Primary Examiner—Kriellion Morgan
Attorney, Agent, or Firm—Gene Harsh; Joseph C. Gil; Aron Preis

[57] ABSTRACT

Polycarbonate compositions comprising a small amount of a certain halogenobenzotriazole were found to be particularly suitable for optical purposes since they feature a desirable high UV-cutoff and since they are processable at high temperatures.

8 Claims, No Drawings

STABILIZED POLYCARBONATES

This application is a division of application Ser. No. 722,029, filed Apr. 11, 1985, now abandoned.

FIELD OF THE INVENTION

The present invention relates to polycarbonate compositions and more particularly to UV-stable polycarbonate compositions.

SUMMARY OF THE INVENTION

Polycarbonate compositions comprising a small amount of a certain halogenobenzotriazole were found to be particularly suitable for optical purposes since they feature a desirable high UV-cutoff and since they are processable at high temperatures.

BACKGROUND OF THE INVENTION

While the use of polycarbonate in the field of the safety eyewear market has been established, its use for molding of certain opthalmic vision care products which also protect against UV radiation has been limited. Existing polycarbonate products are satisfactory for applications where moderate UV screening is required, i.e. up to about 380 NM (nanometers) cutoff. Recent information indicates that radiation between 274 NM and 400 NM may be damaging to the eye and studies point to that UV radiation is a cause of cataracts. The current standards respecting opthalmic lenses include requirements of 0% transmission at 390 NM, 0 to 8% transmission at 395 NM and 0.1 to 15%Z transmission at 400 NM. For safety goggle lenses the standards require 0% transmission at 400 NM.

The art recognizes the need to improve the UV stability of polycarbonate resins and to minimize the transmission of harmful UV radiation through polycarbonate molded parts. While UV absorbers are generally known, not all are compatible with polycarbonate resins at the high temperature required for moldings. Representative of the art in this connection is U.S. Pat. No. 4,096,115 which discloses a large number of UV stabilizers said to be effective in any of a great number of polymeric compositions.

The relevant art is noted to include U.S. Pat. No. 3,322,719 which discloses polycarbonates made stable in respect to UV radiation upon the incorporation therewith of a co-stabilizer selected from a group which includes phosphoric acids, boric acid, and certain phosphates and any member selected among certain benzophenones and a certain 2-(2'-hydroxy-5'-tertiary octylphenyl)-benzotriazole (Cyasorb ®5411). Also relevant in this context is U.S. Pat. No. 3,367,958 which discloses UV stabilized polycarbonates containing up to 0.5% of 2-(2'-hydroxy-5'-methylphenyl)-benzotriazole.

U.S. Pat. No. 3,502,613 is noted to disclose polypropylene compositions which are made UV stable by the incorporation of the stabilizer of the present invention as a co-additive. Also, U.S. Pat. No. 3,892,889 discloses the UV stabilization of polycarbonate by treating the surface of the molded articles with a liquid mixture containing UV absorbers. The absorbers encompass within their scope the stabilizer of the present invention. U.S. Pat. No. 4,206,111 discloses that certain benzotriazoles—including stabilizers of the present invention—are made more efficient as stabilizers of polyolefins upon the addition to the compositions of certain diphosphonites and an oxidation inhibitor. U.S. Pat. No. 4,283,327 discloses UV stabilizers, including certain benzotriazoles which are effective in the context of polycarbonate compositions.

DETAILED DESCRIPTION OF THE INVENTION

The polycarbonate resins useful in the practice of the invention are homopolycarbonate, copolycarbonate and terpolycarbonate resins or mixtures thereof. Preferably, the polycarbonate resins have molecular weights of 10,000–200,000 (weight average molecular weight), more preferably 20,000–80,000, and may alternatively be characterized by their preferred melt flow of 1–24 gm/10 min. at 300° C. per ASTM D-1238. These polycarbonates may be prepared, for example, by the known diphasic interface process from phosgene and dihydroxy compounds by polycondensation (see German OS Nos. 2,063,050; 2,063,052; 1,570,703; 2,211,956; 2,211,957 and 2,248,817 and French Pat. No. 1,561,518 and the monograph, H. Schnell, *Chemistry and Physics of Polycarbonates*, Interscience Publishers, New York, 1964, all incorporated herein by reference).

In the present context, dihydroxy compounds suitable for the preparation of the polycarbonates of the invention conform to the structural formulae (1) or (2)

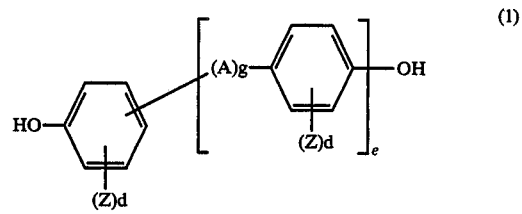

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, and —SO— or —$SO_2$-radical; or a radical of the general formula

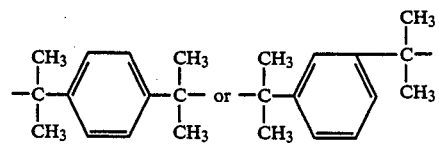

g denotes the number 0 or 1;
e denotes the number 0 or 1;
Z denotes F, Cl, Br or a $C_1$–$C_2$ alkyl and if several Z radicals are substituents in one aryl radical, they may be identical or different;
d denotes 0 or an integer of from 1 to 4; and
f denotes 0 or an integer of from 1 to 3.

Among the useful dihydroxy compounds in the practice of the invention are hydroquinone, resorcinol, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfones and α,α-bis(hydroxyphenyl)-diispropyl-benzenes. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846 (all incorporated herein by reference), in German Offenlegungsschriften Nos. (German Published Specifications) 1,570,703; 2,063,050; 2,063,052; 2,211,956 and 2,211,957, in French Patent Specification No. 1,561,418 and in the monograph, H. Schnell, *Chemistry and Physics of Polycarbonates,* Interscience Publishers, New York, 1964. Further examples of suitable dihydroxy compounds are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α-bis-(4-hydroxyphenyl)-p-diisopropyl-benzene, 2,2-bis-(3-chloro-4-hydroxyphenyl)propane, hydroxybenzophenone and 4,4'-sulfonyl diphenol; the most preferred one is 2,2-bis-(4-hydroxyphenyl)propane (bisphenol A).

The polycarbonates of the invention may entail in their structure, units derived from one or more of the suitable dihydroxy compounds.

The preparation of polycarbonate resins may be carried out in accordance with any of the processes known in the art, for example by the interfacial polycondensation process, polycondensation in a homogeneous phase or by transesterification.

The suitable processes and the associated reactants, catalysts, solvents and conditions are known in the art and have been described, inter alia, in German Pat. Nos. 1,046,311 and 962,274 and in U.S. Pat. Nos. 3,248,414; 3,153,008; 3,215,668; 3,187,065; 3,028,365; 2,999,846; 2,999,835; 2,964,974; 2,970,137; 3,912,638 and 1,991,273.

In the preparation of the polycarbonate resins of the invention monofunctional reactants such as monophenols may be used in order to limit their respective molecular weights. Branching agents may also be employed. Branching may be obtained by the incorporation of small amounts, preferably of between about 0.05 and 2.0 mol % (relative to diphenols employed), of trifunctional or more than trifunctional compounds, especially compounds having three or more phenyl aromatic hydroxyl groups. Polycarbonates of this type are described, for example, in German Offenlegungsschriften Nos. (German Published Specifications) 1,570,533; 1,595,762; 2,116,974 and 2,113,347; British Specification No. 1,079,821 and U.S. Pat. No. 3,544,514 (incorporated herein by reference).

Some examples of compounds with three or more than three phenyl hydroxyl groups which can be used are phloroglucinol, 4,6-dimethyl-2,4,6-tri-(4-hydroxyphenyl)-heptane, 2,4,6-trimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa(4-(4-hydroxyphenylisopropyl)phenyl)-orthoterephthalic acid ester, tetra-(4-hydroxyphenyl)-methane, tetra-(4-(4-hydroxyphenylisopropyl)phenoxy)-methane and 1,4-bis-((4',4''-dihydroxytriphenyl)-methyl)-benzene. Some of the other trifunctional compounds are 2,4-dihydroxy-benzoic acid, trimesic acid, cyanuric chloride and 3,3-bis-(4-hydroxyphenyl)-2-oxo-2,3-dihydroindole.

Among the resins suitable in the practice of the invention are included phenolphthalein-based polycarbonate, copolycarbonates and terpolycarbonates such as are described in U.S. Pat. Nos. 3,0Z36,036 and 4,210,741, both incorporated by reference herein.

The ultraviolet stabilizer in the present context is a halogen substituted benzotriazole having the general formula

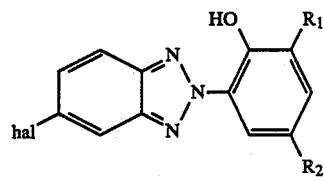

wherein
  hal denotes chlorine or bromine,
  $R_1$ denotes a linear $C_1$-$C_{10}$ alkyl group, a tertiary butyl radical or an aralkyl radical and where
  $R_2$ is $R_1$, preferably a $C_1$-$C_{10}$ alkyl radical.

The preferred embodiment is represented by the formula below

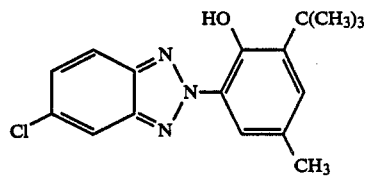

It is available commercially from Ciba-Geigy as Tinuvin®326, chemically termed 2-(3'-tert-butyl-2'-hydroxy-5'-methylphenyl)-5-chlorobenzotriazole.

Tinuvin 326 is a light yellow crystalline powder having a melting point of 140°–141° C. It appears that the thermal and light stability of the stabilizer of the present invention is attributable to an internal chelate bonding of the pnenolic hydoxyl and the benzotriazole ring.

Further, although the precise mechanism operating in the invention is not entirely clear, the experiments leading up to the invention strongly suggest the importance of the halogen substitution in imparting the stability in the present context. The dissociation constant of Tinuvin 326 is about 13 (in 80% aqueous dioxane) rendering the stabilizer relatively less affected by alkalies. The absorption maxima of Tinuvin 326, in chloroform, are 312 NM and 350 NM and the specific extinction coefficients -E- are 46 and 50. In methanol the absorptive maxima values are 298 NM and 343 NM and the specific extinction coefficients -E- are 47 and 51. A further characterization of the preferred stabilizer of the invention is found in Ciba-Geigy Corporation's bulletin A-2701M119A entitled "Tinuvin 326; Ultraviolet Light Absorber for Plastics and Coatings", which document is incorporated herein by reference.

In the preparation of UV-stable compositions in accordance with the invention, a stabilizing amount, i.e. an amount sufficient to render the polycarbonate composition fairly non-transparent to UV light is added to the resin and the composition processed in accordance with known procedures in the polycarbonate art. Preferably, the amount of the stabilizer is in the range of about 0.05 to about 0.5 percent, more preferably the range is about 0.3 to about 0.4 percent, relative to the weight of the composition. Most preferably, for opthalmic lens applications, the amount of Tinuvin 326 is about 0.05 to about 0.3 percent by weight. The most preferable range of stabilizer addition for safety goggle lens applications is about 0.1 to about 0.5 percent by weight.

In one method of preparing the compositions of the invention, the components are dry blended until the additive practically coats the polycarbonate granules. The thus coated granules are then extruded in a conventional extruder and pelletized. Incorporating the stabilizer of the invention may also be carried out by adding it directly to the polycarbonate melt via, for instance, a DV extruder. Further processing of the pellets such as by injection molding will produce a polycarbonate product having an excellent resistance to UV-degradation and be at least substantially opaque to transmission of UV radiation in the 275–400 MN range.

The polycarbonate compositions thus described may contain further agents known in the relevant art for their utility. These include mold release agents, heat stabilizers and plasticizers as well as dyes and pigments, etc. The stabilized compositions are especially useful for applications in the opthalmic and optical lens field as well as for sports and recreation eyewear and are useful for the preparation of films, fibers, coatings, lacquers and variously shaped articles.

The invention is further illustrated but is not intended to be limited by the following examples where all parts and percentages are by weight unless otherwise specified.

EXAMPLES

Examples 1–16

Compositions containing prior art UV-stabilizers were compared to the composition of the invention. The optical and rheological characteristics were determined for compositions containing a polycarbonate resin—a homopolycarbonate based on bisphenol A—(Merlon M-40 from Mobay Chemical Corporation) and about 0.3% of the indicated UV-stabilizer. A phosphorous containing thermal stabilizer added to each of the compositions (0.075%) has no criticality in the present context. The compositions were extruded (Werner-Pfleiderer twin screw extruder) at 255°–265° C. The injection moldings of these and the remaining examples were carried out under either of the conditions which are noted below:

| 3 oz. Farrel | |
|---|---|
| Standard Temperature: | nozzle - 290° C. |
| | front - 295° C. |
| | mid - 295° C. |
| | back - 295° C. |
| Gate-to-gate time: | 80 mil disc - 30 sec. |
| (no purge between shots) | 100 mil disc - 35 sec. |
| | 250 mil disc - 55 sec. |
| | 500 mil disc - 7 min. |
| High Temperature: | nozzle - 270° C. |
| | front - 370° C. |
| | mid - 370° C. |
| | back - 370° C. |
| Gate-to-gate time: | 100 mil disc - 56.5 sec. |
| (no purge between shots) | |

The extruded recipes were molded into 3″ discs of 0.100″ thickness. Pellet and part melt flow rates and the optical properties of the compositions were determined and the results are summarized below (Tables I and II).

TABLE I

Optical Properties of Polycarbonate Compositions[1]
Containing 0.3% UV Stabilizers (Visible Region)

| Example | UV-Stabilizer[2] | % Transmission | Yellowness Index | % Haze | % Transmission @ 400 NM |
|---|---|---|---|---|---|
| 1 | Cyasorb 5411 | 85.7 | 2.0 | 2.4 | 57.0 |
| 2 | Tinuvin P | 85.6 | 1.8 | 2.1 | 57.0 |
| 3 | Tinuvin 350 | 85.7 | 2.6 | 1.8 | 30.0 |
| 4 | Tinuvin 234 | 35.3 | 2.3 | 2.3 | 28.0 |
| 5 | Uvinul D-49 | 83.8 | 17.0 | 1.7 | 50.0 |
| 6 | Tinuvin 326 | 86.1 | 4.7 | 1.8 | ~0.0 |
| 7 | Tinuvin 327 | 85.9 | 3.7 | 1.9 | 0.5 |
| 8 | Tinuvin 622 | 85.0 | 3.7 | 2.2 | 71.0** |

[1]molded at 550° F.
[2]The chemical structures of the UV-stabilizers are noted below.
**Distorted UV scan 1. Cyasorb 5411

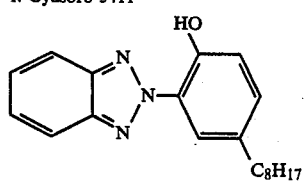

2(2-hydroxy-5-t-octylphenyl) benzotriazole

2. TINUVIN P

TABLE I-continued
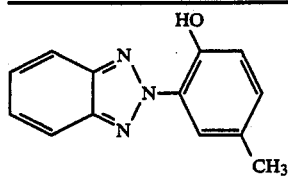
2(2'-hydroxy-5'-methylphenyl) benzotriazole
3. TINUVIN 350
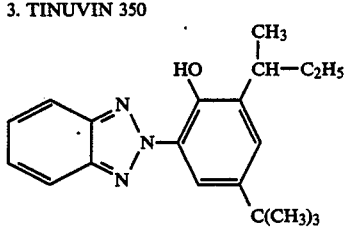
2(3'-sec-butyl-5'-t-butyl-2'-hydroxyphenyl) benzotriazole
4. TINUVIN 234
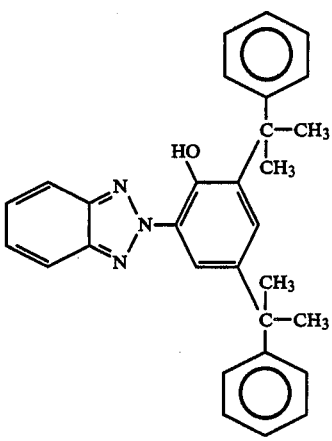
2(3',5'-bis(1-methyl-1-phenylethyl)-2'-hydroxyphenyl) benzotriazole
5. UVINUL ® D-49
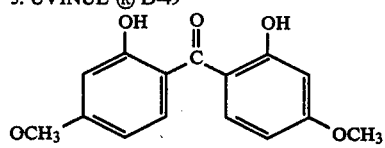
2,2'-dihydroxy-4,4'-dimethoxy-benzophenone
6. TINUVIN 326
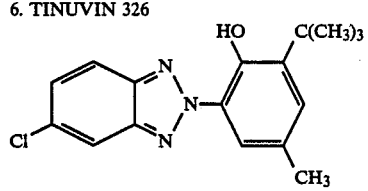
2(3'-t-butyl-2'-hydroxy-5'-methylphenyl)-5-chlorobenzotriazole
7. TINUVIN 327
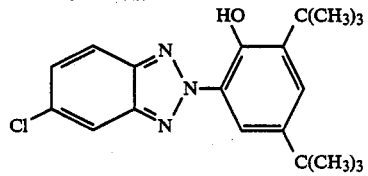

TABLE I-continued

2(3',5'-di-t-butyl-2'-hydroxyphenyl)-
5-chlorobenzotriazole

8. TINUVIN 622

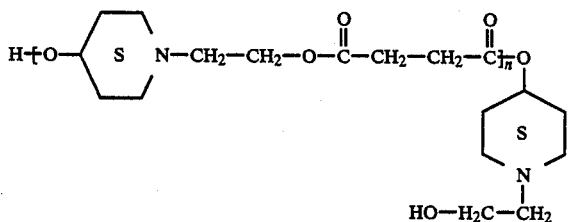

succinate polymer with 4-hydroxy-2,2,
6,6,-tetramethyl-1-piperidineethanol

A second series of compositions identical to the above was similarly prepared and molded except that the molding temperature was about 700° F.

TABLE II

Optical Properties of Polycarbonate Composition[1]
Containing 0.3% UV-Stabilizer (Visible Region)

| Example | UV-Stabilizer[2] | % Transmission | Yellowness Index | % Haze | % Transmission @ 400 NM |
|---|---|---|---|---|---|
| 9 | Cyasorb 5411 | 84.9 | 6.1 | 2.0 | 55.0 |
| 10 | Tinuvin P | 84.8 | 5.7 | 2.2 | 62.0 |
| 11 | Tinuvin 350 | 84.2 | 8.1 | 1.9 | 35.0 |
| 12 | Tinuvin 234 | 84.5 | 6.0 | 2.3 | 28.0 |
| 13 | Uvinul D-49 | 73.4 | 40.7 | 1.8 | 34.0** |
| 14 | Tinuvin 326 | 85.6 | 7.2 | 1.9 | 0.0 |
| 15 | Tinuvin 327 | 85.0 | 7.2 | 2.2 | 0.5 |
| 16 | Tinuvin 622 | 22.9 | 137.0 | 4.1 | 0.0** |

[1]Molded at 700° F.
[2]The chemical structures of the UV-stabilizers are noted below.
**Distorted UV scan The transmission values were determined using a spectrophotometer (Cary 219) at 550 NM in accordance with ASTM D-1003. Haze values were determined in accordance with ASTM D-1003. Yellowness Index was determined in accordance with ASTM D-1925.

The experience with the UV stabilizers has shown that Cyasorb 5411 does not provide the desirable level of UV absorption as shown by the values of transmission at 400 NM. It was also noted that this stabilizer appears to react with the polycarbonate resin at elevated temperature. Tinuvin 350 provides sufficient absorption at 400 NM. However in order to obtain 0% transmission, a relatively large amount of Tinuvin 350 is required which amount tends to cause processing difficulties, i.e. plate-out. Uvinul D-50 and American Cyanamid's Cyasorb UV24 were found to be unstable at 700° F. Tinuvin 622 was determined to be incompatible with polycarbonates. While the stabilizer of the present invention is structurally similar to Tinuvin 327 and to Tinuvin 350, it was found that its efficacy is greater since smaller amounts thereof are required for obtaining the desired properties of the compositions.

Melt flow rates of the compositions in accordance with the invention were determined and compared to the corresponding rates of prior art counterparts (Table III). The rates were determined in accordance with ASTM D-1238, 300° C., 1200 gm.

TABLE III

EXAMPLE 17 (MELT FLOW RATES)

| UV-STABILIZER | 0.1% STABILIZER* | | 0.3% STABILIZER | | | 0.75% STABILIZER* | |
|---|---|---|---|---|---|---|---|
| | Pellets | Parts @ 550° F. | Pellets | Parts @ 550° | Parts @ 700° F. | Pellets | Parts @ 550° F. |
| Cyasorb 5411 | 5.6 | 7.7 | 7.4 | 7.5 | 10.8 | 6.0 | 6.3 |
| Tinuvin P | 5.8 | 7.8 | 7.4 | 7.6 | 11.2 | 6.9 | 6.8 |
| Tinuvin 350 | 5.4 | 7.0 | 7.1 | 7.9 | 10.3 | 5.6 | 6.4 |
| Tinuvin 234 | 5.5 | 7.0 | 7.2 | 7.9 | 9.8 | 5.5 | 5.9 |
| Uvinul D-49 | — | — | 7.6 | 8.2 | 15.6 | — | — |
| Tinuvin 326 | 5.8 | 7.2 | 7.8 | 7.2 | 6.3 | 5.8 | 5.8 |
| Tinuvin 327 | 6.3 | 7.0 | 7.3 | 7.8 | 8.6 | 5.5 | 6.1 |
| Tinuvin 622 | — | — | 10.7 | 12.4 | 71.3 | — | — |

*The extrusions of compositions containing 0.1 and 0.75% of UV stabilizers were carried out in MPM 2", single crew extruder at a temperature range of 270-275° C.

Examples 18-25

A further comparison between the present stabilizer and its prior art counterparts has been carried out and the findings are presented below. A thermogravimetric analysis, isothermal at 300° C. (seal in pan with pinhole) showed that the relative weight loss due to evaporation of these stabilizers is a function of their time duration at that temperature.

TABLE IV
THERMOGRAVIMETRY OF UV-STABILIZERS

| | | % Weight Loss | |
|---|---|---|---|
| Example | Stabilizer | 5 minutes | 10 minutes |
| 18 | Cyasorb 5411 | 51 | 100 |
| 19 | Tinuvin P | 94* | — |
| 20 | Tinuvin 350 | 57 | 100** |
| 21 | Tinuvin 234 | 2.5 | 8 |
| 22 | Uvinul D-49 | 50 | 79 |
| 23 | Tinuvin 326 | 51 | 92 |
| 24 | Tinuvin 327 | 51 | 91 |
| 25 | Tinuvin 622 | 4 | 10 |

*After 3 minutes
**100% loss occurred after 8.5 minutes

Examples 26–55

—and their properties determined and compared to prior art compositions, The concentration of the stabilizers was varied from 0.1% to 0.75% and the physical properties (% Transmission, Yellowness Index, Haze and Transmission at 400 NM) were measured on discs of different thicknesses as noted in Tables V and VI.

TABLE V
OPTICAL DATA IN VISIBLE REGION

| | | | % Transmission | | | | Yellowness Index | | | | % Haze | | | |
|---|---|---|---|---|---|---|---|---|---|---|---|---|---|---|
| Example | Concentration | UV-Stabilizer | .08" | .10" | .25" | .50" | .08" | .10" | .25" | .50" | .08" | .10" | .25" | .50" |
| 26 | 0.1% | Cyasorb 5411 | 87.4 | 86.9 | 82.5 | | 1.4 | 1.0 | .80 | | .42 | .68 | 1.2 | |
| 27 | 0.1% | Tinuvin P | 87.2 | 86.9 | 82.4 | | 1.6 | 1.1 | .88 | | .44 | .71 | 1.0 | |
| 28 | 0.1% | Tinuvin 350 | 87.1 | 86.9 | 82.1 | | 2.2 | 1.3 | 1.6 | | .54 | .73 | 1.4 | |
| 29 | 0.1% | Tinuvin 234 | 87.5 | 86.8 | 82.6 | | 1.2 | 1.5 | 1.3 | | .45 | .44 | .84 | |
| 30 | 0.1% | Tinuvin 326 | 87.5 | 87.0 | 82.6 | | 2.3 | 2.4 | 3.6 | | .38 | .37 | .79 | |
| 31 | 0.1% | Tinuvin 327 | 87.5 | 87.1 | 82.5 | | 1.8 | 1.9 | 2.3 | | .43 | .44 | 1.0 | |
| 32 | 0.3% | Cyasorb 5411 | 86.6 | 85.7 | 80.8 | | 1.8 | 2.0 | 2.7 | | .98 | 2.4 | 2.4 | |
| 33 | 0.3% | Tinuvin P | 86.8 | 85.6 | 81.0 | | 1.9 | 1.8 | 2.8 | | 1.0 | 2.1 | 2.2 | |
| 34 | 0.3% | Tinuvin 350 | 86.9 | 85.7 | 80.8 | | 2.2 | 2.6 | 4.2 | | .89 | 1.8 | 2.3 | |
| 35 | 0.3% | Tinuvin 234 | 86.5 | 85.3 | 79.4 | | 2.2 | 2.3 | 4.1 | | 1.4 | 2.3 | 3.8 | |
| 36 | 0.3% | Tinuvin 326 | 87.2 | 86.1 | 81.1 | 71.6 | 4.1 | 4.7 | 7.7 | 14.7 | .84 | 1.8 | 2.6 | 5.1 |
| 37 | 0.3% | Tinuvin 327 | 87.1 | 85.9 | 80.9 | 70.6 | 3.4 | 3.7 | 6.4 | 11.1 | .86 | 1.9 | 2.7 | 5.4 |
| 38 | 0.5% | Cyasorb 5411 | 87.3 | 86.3 | 81.0 | | 1.6 | 2.4 | 2.6 | | .65 | .70 | 1.6 | |
| 39 | 0.5% | Tinuvin P | 87.1 | 86.1 | 80.2 | | 1.8 | 2.1 | 3.3 | | .74 | .80 | 1.9 | |
| 40 | 0.5% | Tinuvin 350 | 87.2 | 86.4 | 80.8 | | 2.3 | 2.5 | 4.3 | | .68 | .69 | 1.7 | |
| 41 | 0.5% | Tinuvin 234 | 87.2 | 86.4 | 81.1 | | 2.2 | 2.6 | 2.9 | | .55 | .66 | 1.7 | |
| 42 | 0.5% | Tinuvin 326 | 87.0 | 86.2 | 80.5 | 70.6 | 5.7 | 6.4 | 10.2 | 15.6 | .71 | .70 | 1.5 | 4.3 |
| 43 | 0.5% | Tinuvin 327 | 87.2 | 86.5 | 81.3 | 72.4 | 3.9 | 4.6 | 7.8 | 12.9 | .92 | .62 | 1.2 | 2.8 |
| 44 | 0.75% | Cyasorb 5411 | 86.9 | 86.2 | 81.2 | | 2.5 | 2.4 | 3.3 | | .60 | .72 | 1.6 | |
| 45 | 0.75% | Tinuvin P | 86.4 | 85.6 | 79.4 | | 2.8 | 3.1 | 5.5 | | .84 | 1.1 | 2.6 | |
| 46 | 0.75% | Tinuvin 350 | 86.7 | 86.0 | 80.2 | | 3.2 | 3.5 | 5.5 | | .73 | .91 | 2.0 | |
| 47 | 0.75% | Tinuvin 234 | 86.9 | 86.3 | 80.9 | | 3.0 | 2.8 | 3.9 | | .62 | .75 | 1.8 | |
| 48 | 0.75% | Tinuvin 326 | 86.6 | 85.9 | 78.7 | | 7.1 | 8.5 | 13.3 | | .72 | .82 | 2.7 | |
| 49 | 0.75% | Tinuvin 327 | 87.1 | 86.4 | 80.6 | | 5.0 | 6.1 | 10.6 | | .64 | .68 | 1.8 | |

TABLE VI
% TRANSMISSION AT 400 NM

| | | 0.1% | | | 0.3% | | | | 0.5% | | | | 0.75% | | |
|---|---|---|---|---|---|---|---|---|---|---|---|---|---|---|---|
| Example | UV-Stabilizer | .08" | .10" | .25" | .08" | .10" | .25" | .50" | .08" | .10" | .25" | .50" | .08" | .10" | .25" |
| 50 | Cyasorb 5411 | 76 | 75 | 61 | 60 | 57 | 28 | | 55 | 45 | 18 | | 42 | 35 | 12 |
| 51 | Tinuvin P | 75 | 72 | 54 | 62 | 57 | 36 | | 53 | 46 | 20 | | 29 | 27 | 5 |
| 52 | Tinuvin 350 | 63 | 60 | 35 | 40 | 30 | 7 | | 30 | 17 | 3 | | 12 | 9 | .5 |
| 53 | Tinuvin 234 | 63 | 59 | 37 | 40 | 28 | 10 | | 26 | 18 | 2 | | 10 | 6 | .2 |
| 54 | Tinuvin 326 | 8.5 | 5.5 | .2 | .4 | .2 | 0 | 0 | 0 | 0 | 0 | 0 | 0 | 0 | 0 |
| 55 | Tinuvin 327 | 20 | 14 | 1.0 | 1.2 | .5 | 0 | 0 | .2 | 0 | 0 | 0 | 0 | 0 | 0 |

Examples 56–61

Optical properties and color data were determined on moldings produced from the polycarbonate compositions of the invention, using Tinuvin 326 at various concentrations and at two different molding conditions as noted above. Table VII below indicates the properties of these compositions all of which included 0.075% of a thermal stabilizer having no critical effect on the present invention.

TABLE VII

| | | STANDARD TEMPERATURE | | | HIGH TEMPERATURE | | |
|---|---|---|---|---|---|---|---|
| Example | Concentration % | % T @ 400 NM | Total Trans. Y, % | YI | % T @ 400 NM | Total Trans. Y, % | YI |
| | | Thermal Stabilizer - #1 | | | | | |
| 56 | 0.05 | 18 | 86.0 | 2.0 | 22 | 83.5 | 6.7 |
| 57 | 0.10 | 5 | 85.6 | 2.4 | 10 | 84.5 | 5.9 |
| 58 | 0.30 | 0 | 86.0 | 4.6 | 0 | 85.2 | 7.4 |
| | | Thermal Stabilizer - #2 | | | | | |
| 59 | 0.05 | 12 | 85.7 | 3.0 | 12 | 85.7 | 4.9 |
| 60 | 0.10 | 6 | 86.0 | 3.3 | 8 | 85.9 | 5.0 |
| 61 | 0.30 | 0 | 86.1 | 5.1 | 0 | 85.5 | 7.6 |

Further compositions within the scope of the invention were prepared—standard molding temperature—

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An ophthalmic lens comprising a polycarbonate resin blended with a compound conforming structurally to

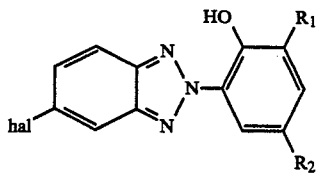

wherein hal denotes a bromine or chlorine atom, $R_1$ and $R_2$ independently denote a linear $C_1-C_{10}$ alkyl, a tertiary butyl radical or an aralkyl radical said compound being present in an amount sufficient to render said lens substantially opaque to transmission of UV radiation in the 275–400 NM range.

2. A safety goggle comprising a polycarbonate resin blended with a compound conforming structurally to

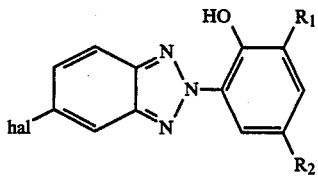

wherein hal denotes a bromine or chlorine atom, $R_1$ and $R_2$ independently denote a linear $C_1-C_{10}$ alkyl, a tertiary butyl radical or an aralkyl radical said compound being present in an amount sufficient to render said goggle substantially opaque to transmission of UV radiation in the 275–400 NM range.

3. Sports and recreation eyewear comprising a polycarbonate resin blended with a compound conforming structurally to

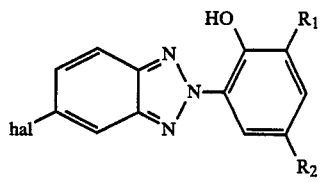

wherein hal denotes a bromine or chlorine atom, $R_1$ $R_2$ independently denote a linear $C_1-C_{10}$ alkyl, a tertiary butyl radical or an aralkyl radical said compound being present in an amount sufficient to render said eyewear substantially opaque to transmission of UV radiation in the 275–400 NM range.

4. An ophthalmic lens comprising a polycarbonate resin blended with about 0.05 to about 0.30 percent by weight of 2-(3'-tert-butyl-2'-hydroxy-5'-methylphenyl)-5-chlorobenzotriazole characterized in that it is substantially opaque to transmission of the UV radiation in the 275–400 NM range.

5. A safety goggle comprising a polycarbonate resin blended with about 0.1 to about 0.5 percent by weight of 2-(3'-tert-butyl-2'-hydroxy-5-methylphenyl)-5-chlorobenzotriazole characterized in that it is substantially opaque to transmission of UV radiation in the 275–400 NM range.

6. An ophthalmic lens comprising a polycarbonate resin blended with about 0.05 to about 0.30 percent by weight of 2-(3',5'-di-t-butyl-2'-hydroxyphenyl)-5-chlorobenzotriazole characterized in that it is substantially opaque to transmission of UV radiation in the 275–400 NM range.

7. A safety goggle comprising a polycarbonate resin blended with about 0.1 to about 0.5 percent by weight of 2-(3',5'-di-t-butyl-2 hydroxyphenyl)-5-chlorobenzotriazole characterized in that it is substantially opaque to transmission of UV radiation in the 275–400 NM range.

8. Sports and recreation eyewear comprising a polycarbonate resin blended with about 0.1 to about 0.5 percent by weight of 2-(3',5'-di-t-butyl-2'-hydroxyphenyl)-5-chlorobenzotriazole characterized in that it is substantially opaque to transmission of UV radiation in the 275–400 NM range.

* * * * *